(12) United States Patent
Luo et al.

(10) Patent No.: US 12,181,397 B2
(45) Date of Patent: Dec. 31, 2024

(54) METHOD, DEVICE, AND SYSTEM FOR TESTING STATIC CONTACT ANGLE OF REAGENT ASPHALT

(71) Applicant: Wuhan University of Technology, Wuhan (CN)

(72) Inventors: Rong Luo, Wuhan (CN); Longchang Niu, Wuhan (CN); Jing Luo, Wuhan (CN); Chongzhi Tu, Wuhan (CN); Tingting Huang, Wuhan (CN); Xiang Wang, Wuhan (CN); Qiang Miao, Wuhan (CN)

(73) Assignee: Wuhan University of Technology, Wuhan (CN)

( * ) Notice: Subject to any disclaimer, the term of this patent is extended or adjusted under 35 U.S.C. 154(b) by 276 days.

(21) Appl. No.: 17/862,902

(22) Filed: Jul. 12, 2022

(65) Prior Publication Data

US 2022/0349802 A1 Nov. 3, 2022

Related U.S. Application Data

(63) Continuation of application No. PCT/CN2021/112717, filed on Aug. 16, 2021.

(30) Foreign Application Priority Data

Sep. 30, 2020 (CN) .......................... 202011062382.2

(51) Int. Cl.
*G01N 13/02* (2006.01)
(52) U.S. Cl.
CPC ..... *G01N 13/02* (2013.01); *G01N 2013/0208* (2013.01)

(58) Field of Classification Search
CPC . G01N 13/02; G01N 2013/0208; G01N 13/00
See application file for complete search history.

(56) References Cited

PUBLICATIONS

"Test of surface free energy of asphalt by digital image processing" by Pan et al. (Year: 2015).*
("A Robust Polynomial Fitting Approach for Contact Angle Measurements" by Atefi et al. (Year: 2013).*

* cited by examiner

*Primary Examiner* — Xin Y Zhong
(74) *Attorney, Agent, or Firm* — Hemisphere Law, PLLC; Zhigang Ma (57) ABSTRACT

Disclosed is a method, device, and system for testing the static contact angle of reagent asphalt, the method includes the following steps: acquiring a side image of a stable droplet formed by a test reagent on asphalt surface, and determining the position of a baseline in the side image; cropping the side image to obtain a droplet image, and extracting droplet contour points in the droplet image; screening out effective contour points corresponding to contours of the two sides of the droplet from the droplet contour points; performing cubic polynomial fitting on the effective contour points to obtain curve function of contour curves on both sides; calculating contact angle value from the curve function and the position of the baseline. The beneficial effects of this disclosure are: this disclosure reduces the difficulty of fitting of the droplet contour and thus improves the calculation precision of the contact angle.

12 Claims, 7 Drawing Sheets

METHOD, DEVICE, AND SYSTEM FOR TESTING STATIC CONTACT ANGLE OF REAGENT ASPHALT

FIELD OF THE DISCLOSURE

The disclosure relates to method, device, and system for testing static contact angle of reagent asphalt.

BACKGROUND

Asphalt mixture has been widely used as the main material of highway pavement. Water damage caused by temperature and humidity changes, vehicle loads, etc. is one of the main forms of asphalt pavement diseases, and the main factor affecting the degree of water damage is the adhesion between asphalt and aggregate. The primary task of reducing water damage of road and improving road service performance is to accurately evaluate the adhesion between asphalt and aggregate. Compared with the boiling method that can only be qualitatively evaluated from a macro perspective and has poor sensitivity, the surface energy theory is widely used because it can well characterize the physical-chemical-thermodynamic properties of asphalt and aggregate materials, and accurately and quantitatively evaluate the adhesion between asphalt and aggregate.

The surface energy parameter of asphalt is the premise and basis for evaluating the adhesion of asphalt mixture using surface energy theory. A commonly used method for measuring asphalt surface energy parameter is the static drop method. The static drop test using optical contact angle principle. Dropping a certain amount of test reagent with known surface energy parameter on asphalt coated glass. Using a high-definition camera to obtain image of droplet that forms stable contact angle on the asphalt surface. Then calculating the contact angle based on the image of the droplet. Then the contact angle is substituted into formula to calculate the surface energy parameter of asphalt.

However, when using the static drop method to calculate the contact angle, the calculation is usually carried out after fitting the whole droplet contour, which not only makes the fitting model complex and slow, but also has low fitting accuracy, which affects the test accuracy of the contact angle.

SUMMARY

In view of this, it is necessary to provide method, device, and system for testing static contact angle of reagent asphalt, in order to solve the problem of complex fitting model and low fitting accuracy of droplet contour by current static drop method.

This disclosure provides a method for testing static contact angle of reagent asphalt, comprising the following steps:
acquiring a side image of a stable droplet formed by a test reagent on asphalt surface, and determining the position of a baseline in the side image; cropping the side image to obtain a droplet image, and extracting droplet contour points in the droplet image; screening out effective contour points corresponding to contours of the two sides of the droplet from the droplet contour points; performing cubic polynomial fitting on the effective contour points to obtain curve function of contour curves on both sides; calculating contact angle value from the curve function and the position of the baseline.

Beneficial effect: this disclosure first acquires a cleaned side image by static drop method, and then extracts the droplet contour points. After the droplet contour points are extracted, the contact angle is not calculated by fitting directly, but the effective contour points on both sides of the droplet are extracted from the droplet contour points. Since the top contour of the droplet is irrelevant to the calculation of the contact angle, it is deleted to avoid reducing the fitting accuracy of the contour points on both sides of the droplet. At the same time, the fitting model of both sides of the contour is simpler than that of the overall contour, and the fitting calculation speed is faster after deleting the top contour.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

Embodiment 1

Figure 1:
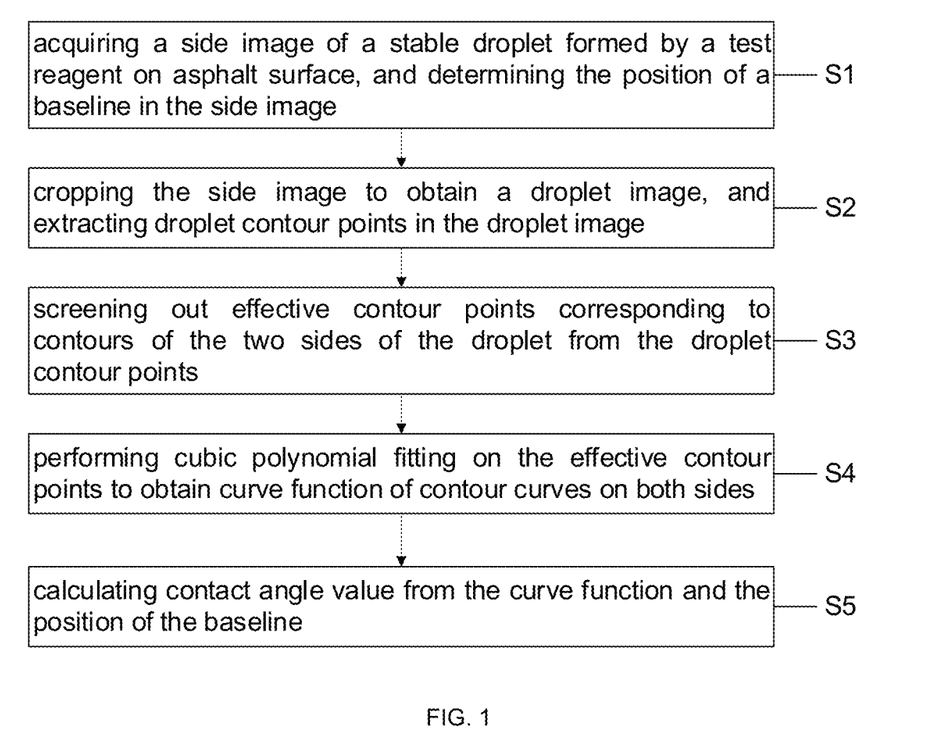
FIG. 1 is the flow chart of the first embodiment of the method for testing static contact angle of reagent asphalt provided by this disclosure.

As shown in FIG. 1, the Embodiment 1 of this disclosure provides a method for testing static contact angle of reagent asphalt, comprising the following steps:

S1, acquiring a side image of a stable droplet formed by a test reagent on asphalt surface, and determining the position of a baseline in the side image;

S2, cropping the side image to obtain a droplet image, and extracting droplet contour points in the droplet image;

S3, screening out effective contour points corresponding to contours of the two sides of the droplet from the droplet contour points;

S4, performing cubic polynomial fitting on the effective contour points to obtain curve function of contour curves on both sides;

S5, calculating contact angle value from the curve function and the position of the baseline.

This embodiment first obtains a side image, and the side image is a drop image of the droplet of the reagent droplet on the asphalt surface using static drop method test. The image is cropped and used for contour extraction. After the droplet contour is extracted, the contour points are screened, the contour at the top of the droplet is deleted, and only the effective contours on both sides of the droplet are retained. A cubic polynomial fitting was performed on the screened effective contour points, and the contact angle was measured by tangent line at the intersection of the fitted curve and the baseline.

This disclosure abandons the idea of integral fitting and adopts piecewise polynomial fitting to select the effective contour point information near the contour baseline on both sides of the droplet to avoid the influence of the contour point information at the top of the droplet on the fitting accuracy and fitting speed. The cubic polynomial fitting model is adopted, which is simple in fitting, high in fitting accuracy, fast in calculation speed, and easy to calculate the contact angle. This disclosure provides a basis for accurately calculating the surface energy parameters of asphalt, evaluating the adhesion between asphalt and aggregates, and selecting an appropriate combination of asphalt aggregates.

Preferably, cropping the side image to obtain a droplet image, specifically including the following steps:

Taking the height direction of the droplet as longitudinal direction, and taking the vertical direction of the height direction of the droplet as the horizontal direction;

Setting the ratio of the droplet diameter to the lateral length of the droplet image, and setting the ratio of the droplet height to the vertical height of the droplet image;

Cropping the side image according to a set ratio to obtain the droplet image.

Figure 2:
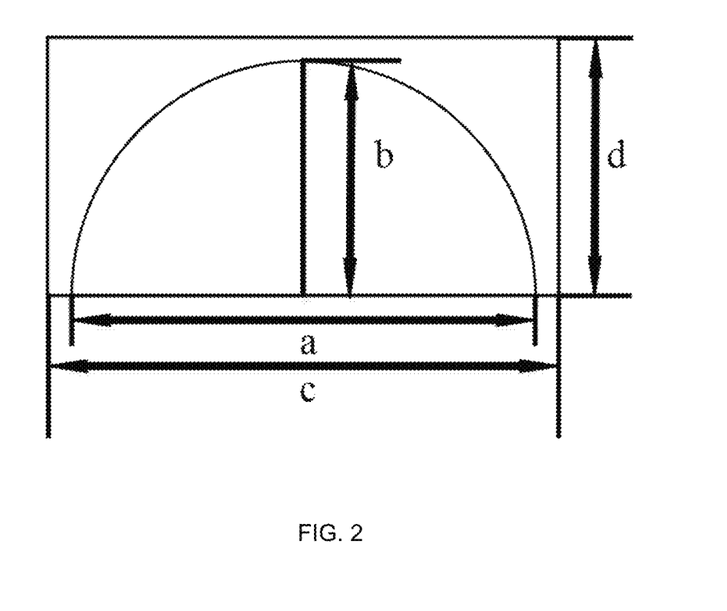
FIG. 2 is the cut schematic diagram of the side image of the first embodiment of the method for testing static contact angle of reagent asphalt provided by this disclosure.

The obtained side images are cut according to a unified standard, so that the droplet occupies a suitable proportion in the droplet image and is in the middle position. Before cutting, the height direction of the droplet (the gravity direction of the droplet) is set to be longitudinal, that is, the y axis coordinate direction, and the vertical direction of the height direction of the droplet is transverse, that is, the x axis coordinate direction. The contact surface between the droplet and the asphalt plane is approximately circular, and the diameter of the droplet is obtained, as shown in FIG. 2. The cutting standard is as follows: the ratio of the droplet diameter a to the image length c is set as a fixed ratio, and the ratio of the droplet height b to the image height d is set as a fixed ratio. The two fixed ratios are set to be between 80% and 100%, and 90% is taken in this embodiment.

Figure 3:
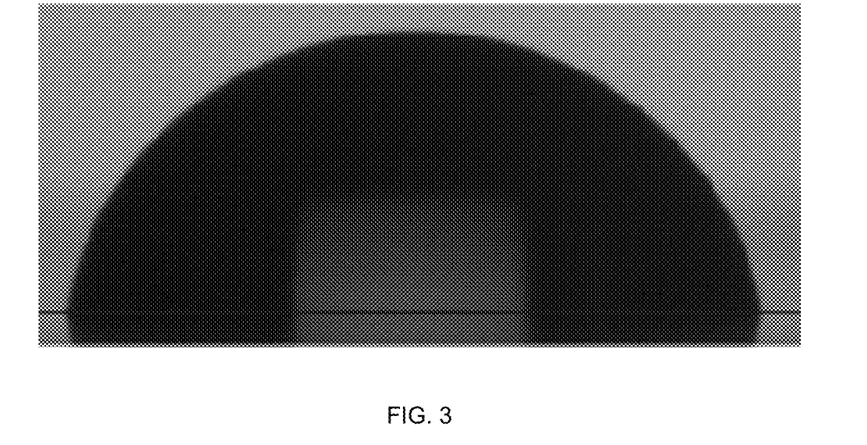
FIG. 3 is a schematic diagram for the baseline position confirmation of the first embodiment of the method for testing static contact angle of reagent asphalt provided by this disclosure.

In this embodiment, the droplet image obtained by cutting is shown in FIG. 3, and the baseline position of the droplet image is obtained by importing the cropped droplet images into Matlab software and displaying it in the drawing window; calling the impixelinfo function, and placing the mouse on the baseline, the pixel and coordinate information of the baseline can be displayed, and the y-coordinate value of the baseline is recorded as J.

Preferably, extracting droplet contour points in the droplet image, specifically including the following steps:

converting the droplet image to a grayscale image, and increasing the pixel values of all pixels in the grayscale image;

performing median filtering on the grayscale image;

using Canny operator to extract all contour points in the grayscale image;

deleting noise contour points in the contour points according to the size and shape of the droplet to obtain the droplet contour points.

Figure 4:
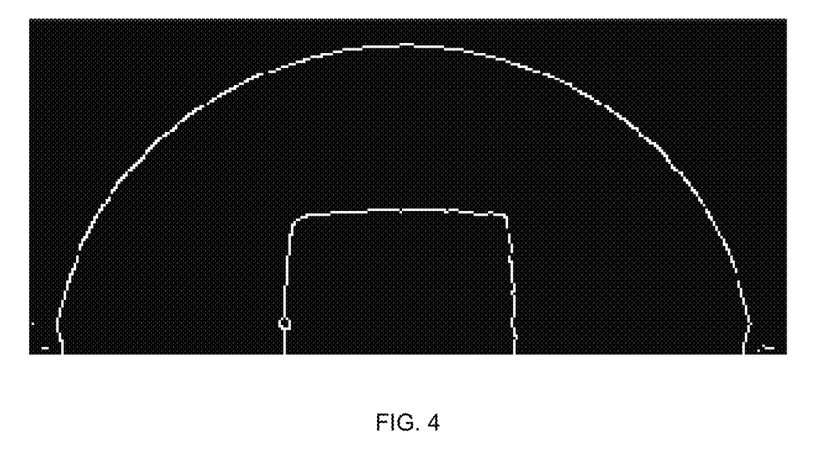
FIG. 4 is a diagram for all contour point extraction result of the first embodiment of the method for testing static contact angle of reagent asphalt provided by this disclosure.

Before extracting the contours, image preprocessing is performed to convert the colored droplet images into grayscale images. Boosts the pixel values of all pixels in the grayscale images to reduce noise outside the droplet contour. The boosted pixel value is generally within 150 and can be adjusted according to the brightness of the image and the effect of contour extraction. The grayscale image is smoothed with a median filter of a 3*3 window, which can further eliminate the noise outside the droplet. Through image cropping and image denoising preprocessing, the interference of redundant shadows and noise in droplet images to contour extraction is reduced. The contours in the droplet image are then extracted using the Canny operator, and the extracted results include the complete droplet contour, the halo at the center of the droplet, and individual noise points. As shown in FIG. 4, the contour points in the extracted contour image are white, and the pixel value is 1, and the remaining points are black, and the pixel value is 0. According to this feature, the horizontal/vertical coordinates of all points with a pixel value of 1 in the contour image are extracted, and assigned to the variables x and y respectively to obtain the coordinates of the contour points. The extraction of contour points in this embodiment is realized by programming in Mat lab software, and other software can also be used for this realization.

Figure 5:
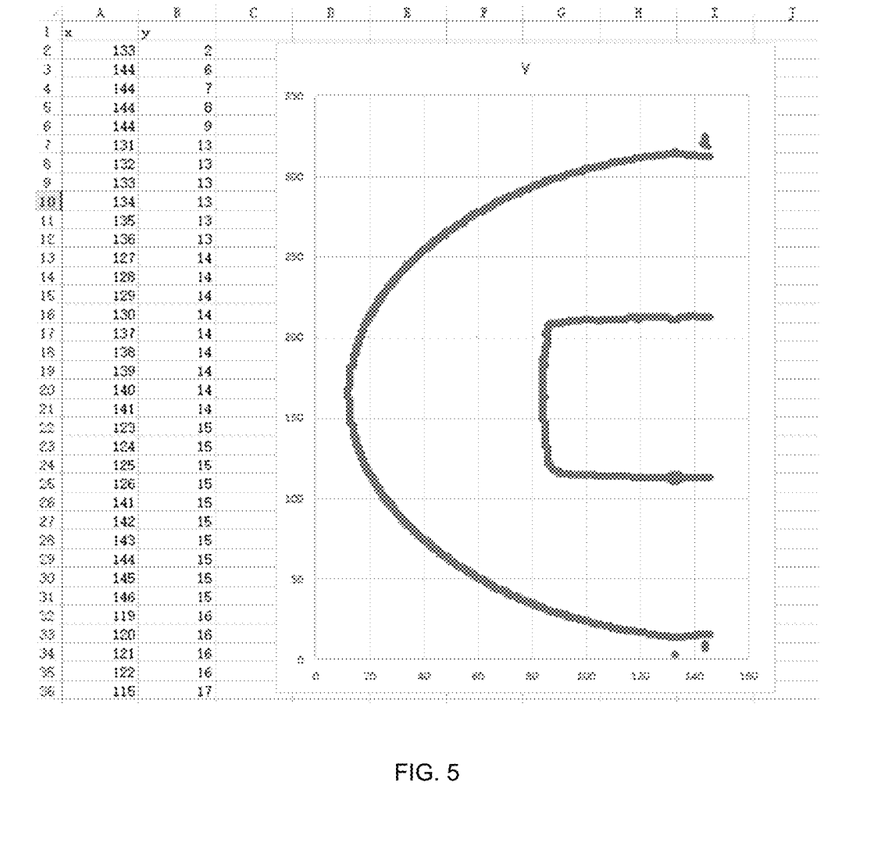
FIG. 5 is the contour point scatter diagram of the first embodiment of the method for testing static contact angle of reagent asphalt provided by this disclosure.
Figure 6:
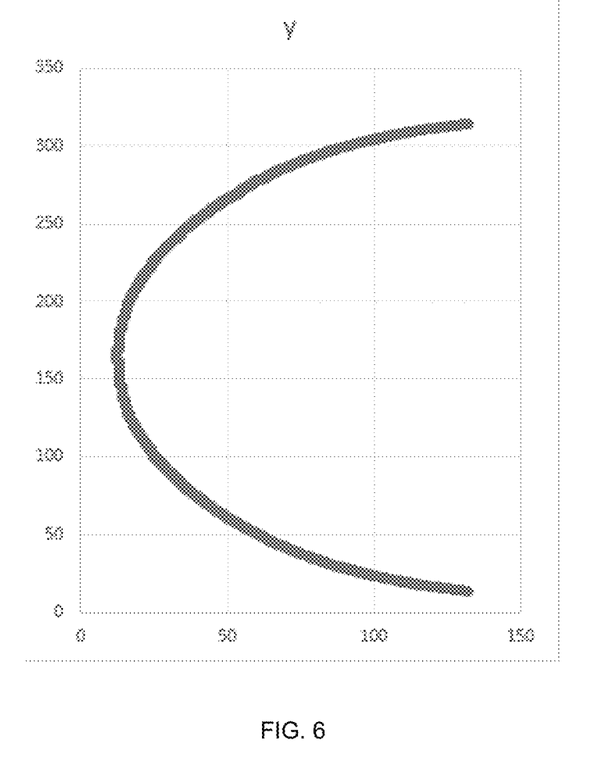
FIG. 6 is the contour point scatter diagram after denoising of the first embodiment of the method for testing static contact angle of reagent asphalt provided by this disclosure.

In order to facilitate the polynomial fitting, firstly, the x and y coordinate values of the contour image are exchanged and rotated 90° counterclockwise, as shown in FIG. 5. Screening out the contour points whose x-coordinate is less than the J value (the y-coordinate value of the baseline), that is, screening out the invalid contour points below the baseline; then filtering out these invalid contour points according to the droplet aperture and the position of individual noise points in the droplet contour and deleting, leaving only the complete droplet contour points, as shown in FIG. 6. Taking FIG. 5 as an example, the x-coordinate of the droplet center aperture is between 80 and 160, and the y-coordinate is between 100 and 250. The points that meet these conditions can be deleted. The screening of contour points in this embodiment is realized by programming in EXCEL software, and other software can also be used for the realization.

Preferably, screening out effective contour points corresponding to contours of the two sides of the droplet from the droplet contour points, specifically:

sorting the droplet contour points according to the coordinate value of the droplet height direction, and selecting the droplet contour points whose coordinate values in the droplet height direction are greater than set threshold to obtain the effective contour points corresponding to the contours on both sides.

Since the contact angle is only measured on both sides of the droplet (both sides in the height direction), the contour of the top of the droplet is redundant information. Arranging the contour points in ascending order of y-coordinates, and taking part of the contour points on both sides of the droplet contour that account for ¼ of the total contour as the effective contour points. For example, a droplet contour has 100 contour point data in total, and 25 contour points on the left side of the droplet and 25 contour points on the right side of the droplet are intercepted as valid contour points.

Preferably, calculating contact angle value from the curve function and the position of the baseline, specifically:

calculating intersection points of the baseline and the contour curves on both sides according to the curve function and the position of the baseline; drawing the tangent to the corresponding side contour curve through the intersection point; calculating the slope of the tangent; calculating the contact angle value of the corresponding side contour curve from the slope; taking the average value of the contact angle of the contours on both sides as the final contact angle value.

Figure 7:
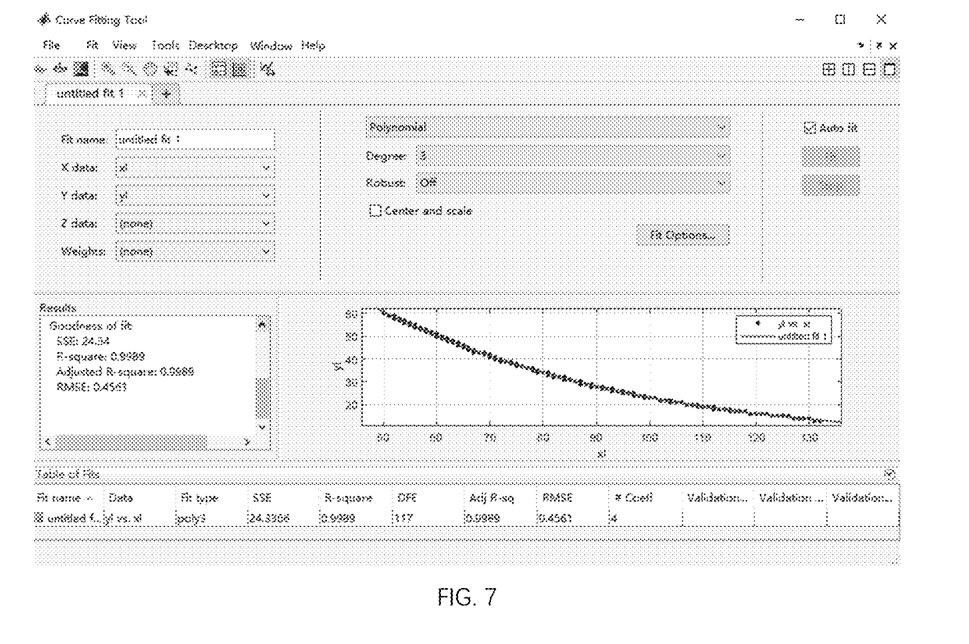
FIG. 7 is fitting schematic diagram of the effective contour points of the first embodiment of the method for testing static contact angle of reagent asphalt provided by this disclosure.
Figure 8:
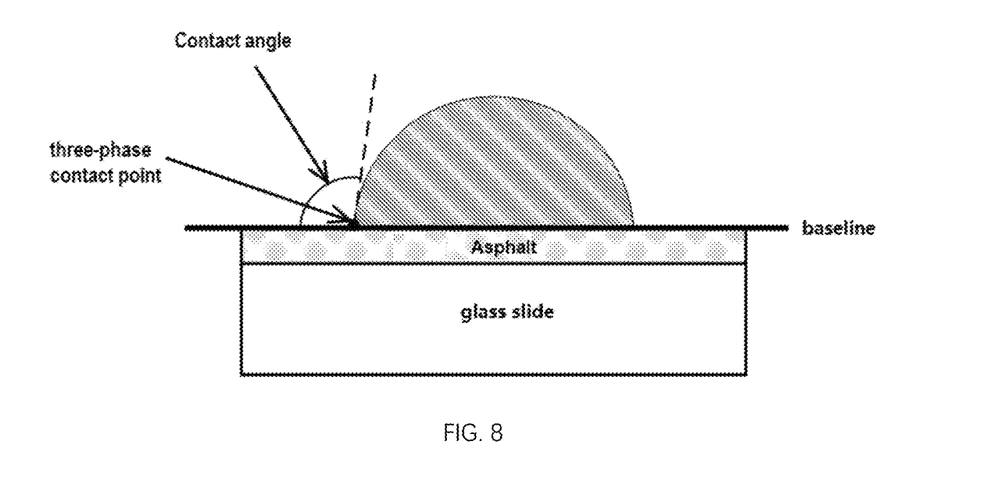
FIG. 8 is a principle diagram of the contact angle calculation of the first embodiment of the method for testing static contact angle of reagent asphalt provided by this disclosure.

Arranging the selected valid contour points in ascending order of x-coordinate, assigning the x/y coordinates of the left contour curve to variables xL, yL, and assigning the x/y coordinates of the right contour curve to variables xL, yL. Performing cubic polynomial fitting on variables xL, yL and variables xL, yL respectively, as shown in FIG. 7, to obtain a polynomial curve function model. Saving the fitted curve function in the variable panel, the left curve function is named fittedmodelL, and the right curve function is named fittedmodelR. As shown in FIG. 8, according to the curve function and J value on both sides, the intersection points of the contour curves on both sides and the baseline are calculated respectively, and the slope of the tangent line passing through the intersection point is calculated to obtain the contact angle values of the two sides of the contour, and the contact angle values of the two sides. The average value was taken as the final contact angle value.

Preferably, the method also includes the following step:

Selecting a variety of test reagents; acquiring multiple droplet images for each test reagent; calculating a contact angle value from each droplet image; calculating the average value of the contact angle corresponding to the multiple droplet images of each test reagent to obtain the contact angle value of the corresponding type of test reagent.

In order to obtain a more accurate contact angle value, each asphalt needs to be tested with at least three reagents, each reagent for at least three repeated tests. In this case, four reagents were used: distilled water, formamide, ethylene glycol and glycerol. A total of 12 droplet images were obtained. The average contact angles measured by three parallel tests between each reagent and asphalt are used as the final results.

Preferably, the method also includes the following step: calculating the surface energy parameter of the asphalt from the contact angle value.

After the contact angle was measured, the surface energy parameters of the known test reagent and the measured contact angle were substituted into the Young-Dupre equation to calculate the unknown surface energy parameters of asphalt.

Specifically, in order to explain this disclosure more clearly, the contact angle calculation of 70 #matrix asphalt produced by a company in Hubei Province is described below:

Using 70 #matrix asphalt produced by a company in Hubei Province to prepare asphalt coating slides and photograph droplet images;

Enough distilled water, formamide, ethylene glycol and glycerol reagents were respectively injected into the three syringes of DSA100. Placing 70 #matrix asphalt smeared glass in the center of the test chamber facing the camera. Selecting a reagent syringe and hang the needle over the asphalt slide. The control software releases 5 L reagent and the droplets hang on the needle. The test chamber was lifted, and the baseline position was determined at the moment when the droplet contacted with the asphalt surface. At this time, the droplet dropped on the asphalt surface. Repeated tests resulted in 12 droplet images with baselines.

2. Cutting the image, preprocessing the image noise reduction, and extracting the droplet contour;

The 12 images obtained were uniformly cut according to the ratio of droplet diameter a to image length c, and the ratio of droplet height b to image height c was 80%. Importing an image for brightness enhancement, median filtering, and contour extraction. Dividing the horizontal and vertical coordinates of all contour points to variables x, y.

3. Obtaining effective contour point coordinates by screening x and y variables;

Converting data for x and y. The contour points below the baseline, the optical circle points of the droplet center, and other small noises were selected and deleted to obtain the complete droplet contour with a counter-clockwise rotation of 90°. The points on both sides of the droplet accounting for ¼ of the total number of contour points are selected as effective points.

4. The coordinates of the effective contour points are fitted by cubic polynomial to calculate the contact angle;

The effective contour points are fitted by cubic polynomial. The fitting curve function model is saved, and the contact angle between the left and right sides is calculated by inputting the coordinate value J of the baseline.

5. The above steps run only once to process one droplet image and 12 images need to be repeated 12 times. The six contact angles of each reagent in three repeated tests were averaged, and finally the contact angles corresponding to the four test reagents were obtained.

The test results are as follows:

TABLE 1

| Reagent type | Image number | Left contact angle (°) | Right contact angle (°) | Average value (°) | coefficient of variation |
|---|---|---|---|---|---|
| distilled water | 1 | 94.75 | 93.67 | 95.21 | 0.92% |
| | 2 | 96.08 | 95.39 | | |
| | 3 | 95.71 | 95.64 | | |
| formamide | 1 | 83.91 | 84.37 | 83.73 | 0.74% |
| | 2 | 83.53 | 82.63 | | |
| | 3 | 84.20 | 83.72 | | |
| glycol | 1 | 79.28 | 78.50 | 78.38 | 0.75% |
| | 2 | 78.52 | 78.15 | | |
| | 3 | 78.37 | 77.47 | | |
| glycerol | 1 | 92.89 | 91.64 | 92.13 | 0.84% |
| | 2 | 92.54 | 92.93 | | |
| | 3 | 91.75 | 91.04 | | |

Table 1 shows that the contact angle of 70 #asphalt measured by this disclosure has small variation coefficient, good repeatability, and stability.

Embodiment 2

Embodiment 2 of this disclosure provides a device for testing static contact angle of reagent asphalt, comprising a processor and a memory, the memory stores a computer program, and when the computer program is executed by the processor, the method for testing static contact angle of reagent asphalt provided by Embodiment 1 is implemented.

The device for testing static contact angle of reagent asphalt provided by this embodiment of this disclosure is used to realize the method for testing static contact angle of reagent asphalt, therefore, the technical effect possessed by the device for testing static contact angle of reagent asphalt is the same as the method for testing static contact angle of reagent asphalt, and will not be repeated here.

Embodiment 3

Embodiment 3 of this disclosure provides a system for testing static contact angle of reagent asphalt, comprising the device for testing static contact angle of reagent asphalt provided by Embodiment 2, the system also comprises an optical contact angle meter;
the optical contact angle meter is used for the titration of the test reagent and the photographing of the side image, and the side image is sent to the device for testing static contact angle of reagent asphalt.

The optical contact angle meter that this embodiment adopts is the optical contact angle meter Drop Shape Analysis 100 (DSA100) of German production. The device consists of a high-precision needle for titrating reagents, a high-definition camera for capturing images, and a software device for image processing. The reagent is released onto the asphalt surface through a high-precision needle, and the image is captured by a high-definition camera and projected into the software interface. This example utilizes the device to perform titration of reagents and to take images of droplets on asphalt.

Figure 9:
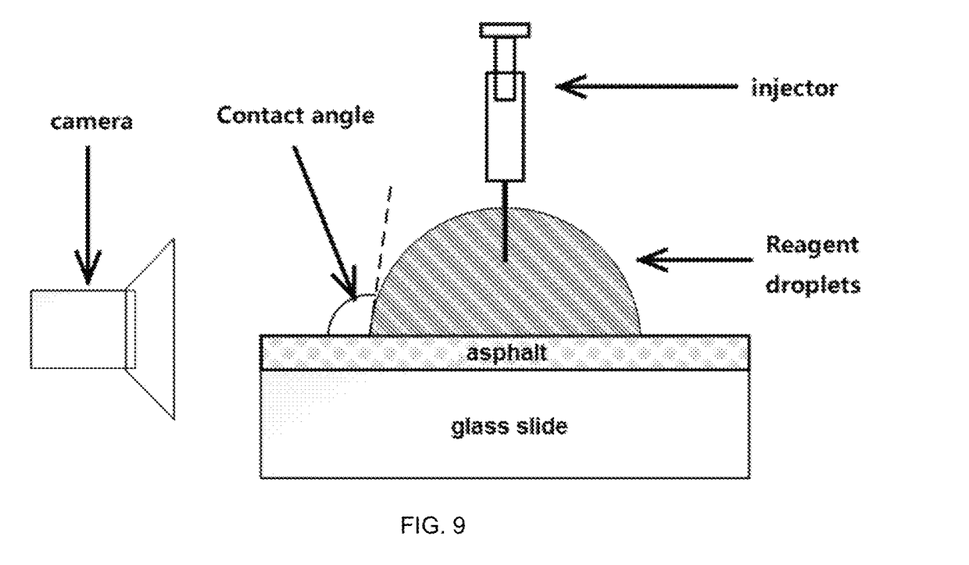
FIG. 9 is the system architecture diagram of the first embodiment of the method for testing static contact angle of reagent asphalt provided by this disclosure.
Figure 10:
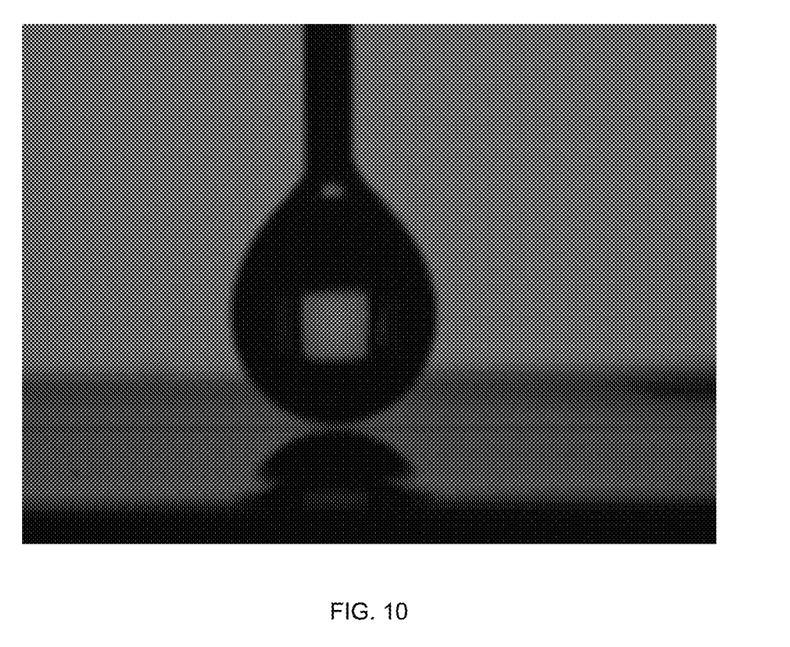
FIG. 10 is a diagram of the baseline position determination of the first embodiment of the method for testing static contact angle of reagent asphalt provided by this disclosure.

Specifically, as shown in FIG. 9, placing the asphalt-coated glass slide flat in the test chamber and align it in front of the camera, so that the glass slide appears in the center of the image. In order to measure the static contact angle and avoid slippage of droplets due to lateral gravity due to the tilt of the slide, the upper surface of the asphalt slide should be kept horizontal. Filling the injection needle tube of the high-precision needle with the test reagent, and exhausting the air in the front section of the needle tube until there are continuous droplets dripping out. Adjusting the position of the needle so that it hangs directly above the asphalt slide, and keeping a certain distance between the needle and the asphalt surface. 4~5 L of test reagent was released, and the droplet was stably suspended on the needle and formed a clear reflection on the asphalt surface. Lifting the test chamber so that the upper surface of the asphalt is close to the droplet. As shown in FIG. 10, when the droplet intersects with the reflection, a horizontal straight line is determined at the intersection, which is the "baseline". At this moment, when the bottom of the droplet contacts the reflection of the droplet on the asphalt surface, it is quickly determined at the contact point. The position of the lower baseline is to ensure that the position of the baseline is on the contact surface between the droplet and the asphalt. The horizontal straight line in FIG. 10 is the baseline, which represents the contact surface between the reagent droplet and the asphalt. The intersection of the baseline and the edge of the droplet is the triple contact point of reagent, asphalt, and air, which is where the contact angle is measured. As shown in FIG. 3, the droplet will drip onto the asphalt after contact with the asphalt, and a side image of a stable droplet with a baseline is obtained at this time.

Embodiment 4

Embodiment 4 of this disclosure provides a computer storage medium, on which a computer program is stored, when the computer program is executed by a processor, the method for testing static contact angle of reagent asphalt provided by Embodiment 1 is realized.

The computer storage medium provided by this embodiment of this disclosure is used to realize the method for testing static contact angle of reagent asphalt, therefore, the technical effect possessed by the computer storage medium is the same as the method for testing static contact angle of reagent asphalt, and will not be repeated here.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for testing static contact angle of reagent asphalt, comprising the following steps:
    acquiring a side image of a stable droplet formed by a test reagent on asphalt surface, and determining a position of a baseline in the side image, wherein a height direction of the droplet is defined as a y axis coordinate direction, and a vertical direction of the droplet is defined as an x axis coordinate direction, the baseline represents a contact surface between the reagent droplet and the asphalt, a y-coordinate value of the baseline is defined as J;
    cropping the side image to obtain a droplet image, and extracting droplet contour points in the droplet image, wherein the extracted contour points comprise a complete droplet contour, an aperture at a center of the droplet, and noise points, extracting droplet contour points in the droplet image comprising:
        extracting horizontal and vertical coordinates of all points with a pixel value of 1 in the droplet image to form a contour image, and
        assigning the horizontal and vertical coordinates of the points to variables x and y respectively as x and y coordinate values of the contour points;
    screening out effective contour points corresponding to contours of two sides of the droplet from the droplet contour points, comprising:
        exchanging x and y coordinate values of the contour image of the contour points by rotating the contour image 90° counterclockwise;
        selecting the contour points whose x-coordinate values are less than J;
        filtering out the contour points of the aperture and the noise points to maintain the complete droplet contour;
    performing cubic polynomial fitting on the effective contour points to obtain curve function of contour curves on both sides;
    calculating contact angle value from the curve function and the position of the baseline.

2. The method for testing static contact angle of reagent asphalt according to claim 1, cropping the side image to obtain a droplet image, specifically including the following steps:
    taking the height direction of the droplet as a longitudinal direction, and taking the vertical direction of the height direction of the droplet as a horizontal direction;

setting a ratio of the droplet diameter to a lateral length of the droplet image, and setting a ratio of the droplet height to the vertical height of the droplet image;

cropping the side image according to a set ratio to obtain the droplet image.

3. The method for testing static contact angle of reagent asphalt according to claim 1, extracting droplet contour points in the droplet image, specifically further including the following steps:

converting the droplet image to a grayscale image, and increasing the pixel values of all pixels in the grayscale image;

performing median filtering on the grayscale image;

using Canny operator to extract all the contour points in the grayscale image;

deleting noise contour points in the contour points according to the size and shape of the droplet to obtain the droplet contour points.

4. The method for testing static contact angle of reagent asphalt according to claim 1, screening out effective contour points corresponding to contours of the two sides of the droplet from the droplet contour points, specifically:

sorting the droplet contour points according to the y-coordinate values of the droplet contour points, and selecting the droplet contour points whose y-coordinate values are greater than a set threshold to obtain the effective contour points corresponding to the contours on both sides.

5. The method for testing static contact angle of reagent asphalt according to claim 1, calculating contact angle value from the curve function and the position of the baseline, specifically:

calculating intersection points of the baseline and the contour curves on both sides according to the curve function and the position of the baseline;

drawing a tangent to the corresponding side contour curve through the intersection point; calculating a slope of the tangent;

calculating the contact angle value of the corresponding side contour curve from the slope; and taking an average value of the contact angle of the contours on both sides as the final contact angle value.

6. The method for testing static contact angle of reagent asphalt according to claim 1, wherein the method also includes the following step:

selecting a variety of test reagents;

acquiring multiple droplet images for each test reagent;

calculating a contact angle value from each droplet image; and calculating an average value of the contact angle corresponding to the multiple droplet images of each test reagent to obtain the contact angle value of the corresponding type of test reagent.

7. The method for testing static contact angle of reagent asphalt according to claim 1, wherein the method also includes the following step:

calculating a surface energy parameter of the asphalt from the contact angle value.

8. A device for testing static contact angle of reagent asphalt, comprising a processor and a memory, the memory stores a computer program, and when the computer program is executed by the processor, the method for testing static contact angle of reagent asphalt according to claim 1 is implemented.

9. A system for testing static contact angle of reagent asphalt, comprising the device for testing static contact angle of reagent asphalt as claimed in claim 8, the system also comprises an optical contact angle meter;

the optical contact angle meter is used for titration of the test reagent and photographing of the side image, and the side image is sent to the device for testing static contact angle of reagent asphalt.

10. A non-transitory computer storage medium, on which a computer program is stored, when the computer program is executed by a processor, the method for testing static contact angle of reagent asphalt as claimed in claim 1 is realized.

11. The method for testing static contact angle of reagent asphalt according to claim 1, wherein the x-coordinate value of the aperture is between 80 and 160, and the y-coordinate value of the aperture is between 100 and 250.

12. The method for testing static contact angle of reagent asphalt according to claim 4, further comprising:

arranging the contour points in ascending order of y-coordinate values; and taking part of the contour points on both sides of the droplet contour that account for ¼ of the total contour as the effective contour points.

* * * * *